United States Patent
Dingess et al.

(10) Patent No.: US 9,068,418 B2
(45) Date of Patent: Jun. 30, 2015

(54) DEEP WATER OIL PIPE PINCHER

(76) Inventors: Billy E. Dingess, Harts, WV (US); Donald Ray McCann, Harts, WV (US)

(*) Notice: Subject to any disclaimer, the term of this patent is extended or adjusted under 35 U.S.C. 154(b) by 27 days.

(21) Appl. No.: 12/802,490

(22) Filed: Jun. 9, 2010

(65) Prior Publication Data

US 2011/0302987 A1    Dec. 15, 2011

(51) Int. Cl.
*E21B 29/08* (2006.01)
*F16L 1/26* (2006.01)
*F16L 55/10* (2006.01)
*F16L 55/18* (2006.01)

(52) U.S. Cl.
CPC . *E21B 29/08* (2013.01); *F16L 1/26* (2013.01); *F16L 55/10* (2013.01); *F16L 55/18* (2013.01)

(58) Field of Classification Search
USPC ............. 29/402.01, 402.05, 402.09, 402.13, 29/402.19; 269/32; 254/134.3 SC; 72/31.02, 31.06, 300, 304, 367.1, 72/370.12, 453.01, 453.15; 125/23.01
See application file for complete search history.

(56) References Cited

U.S. PATENT DOCUMENTS

| | | | | | |
|---|---|---|---|---|---|
| 4,019,334 | A | * | 4/1977 | Sinclair et al. | 405/169 |
| 4,109,472 | A | * | 8/1978 | Harris | 405/302 |
| 4,163,477 | A | * | 8/1979 | Johnson et al. | 166/363 |
| 4,445,804 | A | * | 5/1984 | Abdallah et al. | 405/173 |
| 4,986,360 | A | * | 1/1991 | Laky et al. | 166/351 |
| 5,074,712 | A | * | 12/1991 | Baugh | 405/158 |
| 5,437,517 | A | * | 8/1995 | Carrioli et al. | 405/169 |
| 5,931,442 | A | * | 8/1999 | Cummins | 251/1.1 |
| 2005/0063786 | A1 | * | 3/2005 | Trepka et al. | 405/183.5 |
| 2005/0194000 | A1 | * | 9/2005 | Todack | 125/23.01 |

* cited by examiner

*Primary Examiner* — Shelley Self
*Assistant Examiner* — Pradeep C Battula

(57) ABSTRACT

This invention is a hydraulic operated pipe pincher. It has a head segment having two hydraulic jacks linked with said head section, a sliding die head housing with said jacks connected to said sliding die head and a foot segment having a die linked with said foot segment. A boat is located on the surface of the water above where the pipe is to be pinched is located. The pipe pincher would be lowered and positioned around the pipe by way of a manipulator arm on a deep water submarine. The sliding die head would then be forced down against the pipe to pinch the pipe closed to restrict or nearly stop the flow of oil within the pipe. The dies are shaped to compress the pipe from each side equally.

7 Claims, 3 Drawing Sheets

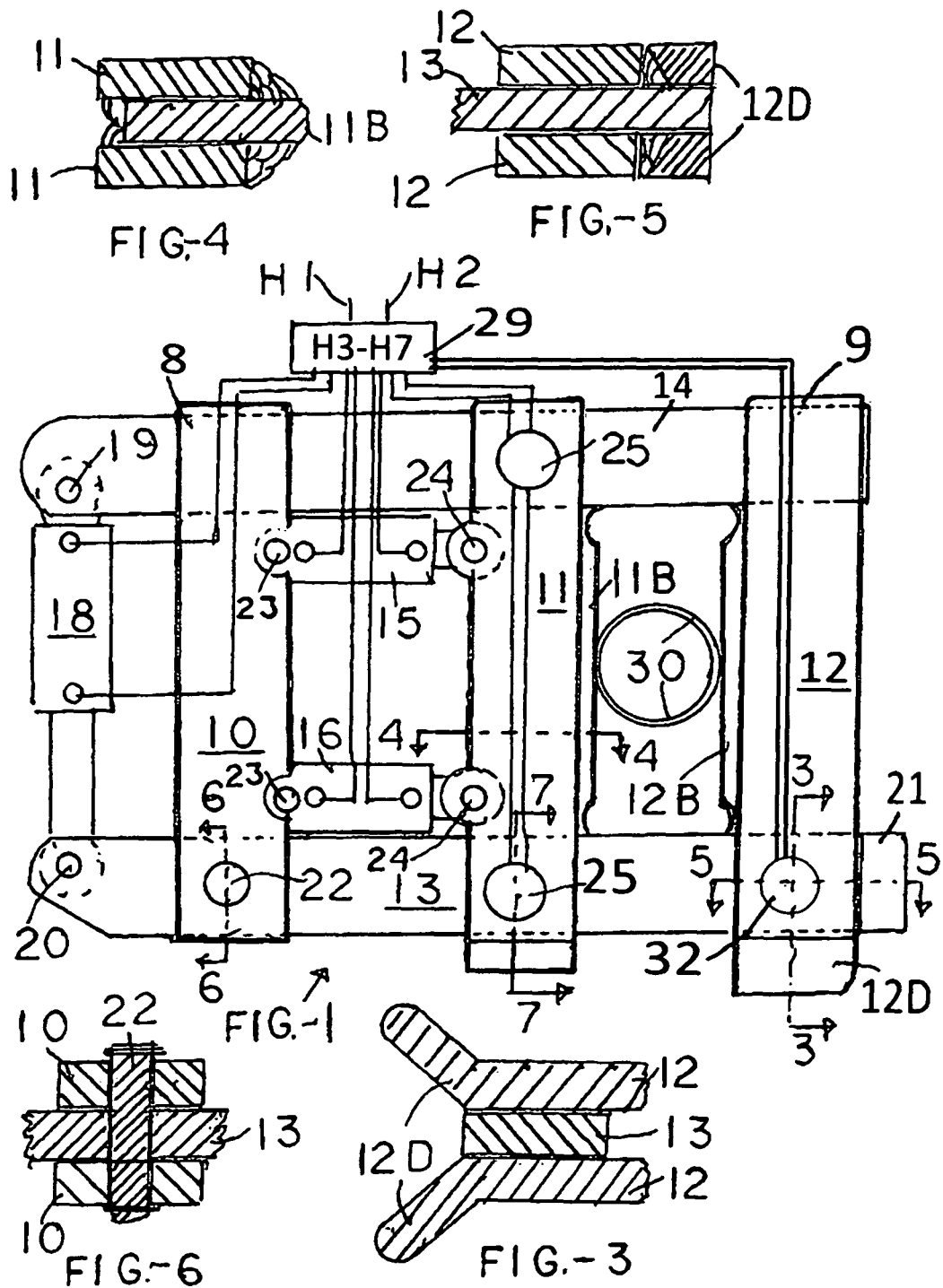

DEEP WATER OIL PIPE PINCHER

BACKGROUND OF THE INVENTION

A method is needed to stop the oil flow in the Gulf of Mexico as oil keeps flowing from a well one mile below the surface of the Gulf. This invention will show a means to pinch off the oil flow from the riser pipe of the well.

A pipe pincher is shown that can be positioned around the riser pipe by way of the weight of the pincher being supported by a cable from a boat on the Gulf surface, then manipulated by way of a submarine manipulator arm to position the pipe pincher around the riser pipe. A control station at the surface and signals from the submarine can operate the hydraulics to hydraulically force a die head against the pipe to pinch the pipe or flatten it to where the oil flow is nearly or completely stopped.

This would be a fast and efficient way to solve this problem. A pipe pincher should be designed for every oil rig drilling below the surface of the water based on the diameter of the pipe and thickness of the pipe.

BRIEF SUMMARY OF THE INVENTION

The oil companies don't seem to be well prepared for accidents that may happen in deep water drilling. They should have any and all means that may be of help in slowing and/or stopping an oil flow when things go wrong.

This invention came about because of need by the accident in the Gulf of Mexico by British Petroleum(BP)'s explosion. We call it a pipe pincher. A pipe will easily bend and stretch to allow it to be pinched at both sides. The pincher could be fabricated to provide up to or above 100 tons of pressure on die heads to totally pinch the two sides of the pipe together. The weight of the pipe pincher could be supported from a crane located on a boat at the surface of the water and then manipulated by a submarine on the ocean floor to place the pincher dies around the pipe.

Obviously the pipe must be accessible for this to work. The top of the well head would provide access to the riser pipe. This is an important tool to have on hand should the need arise to use it.

BRIEF DESCRIPTIONS OF THE DRAWINGS

Figure 7:
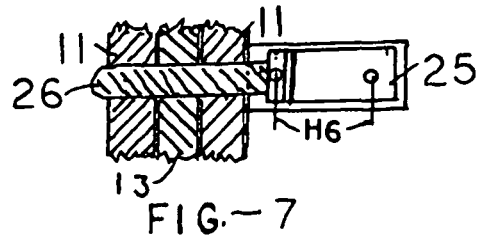
Figure 2:
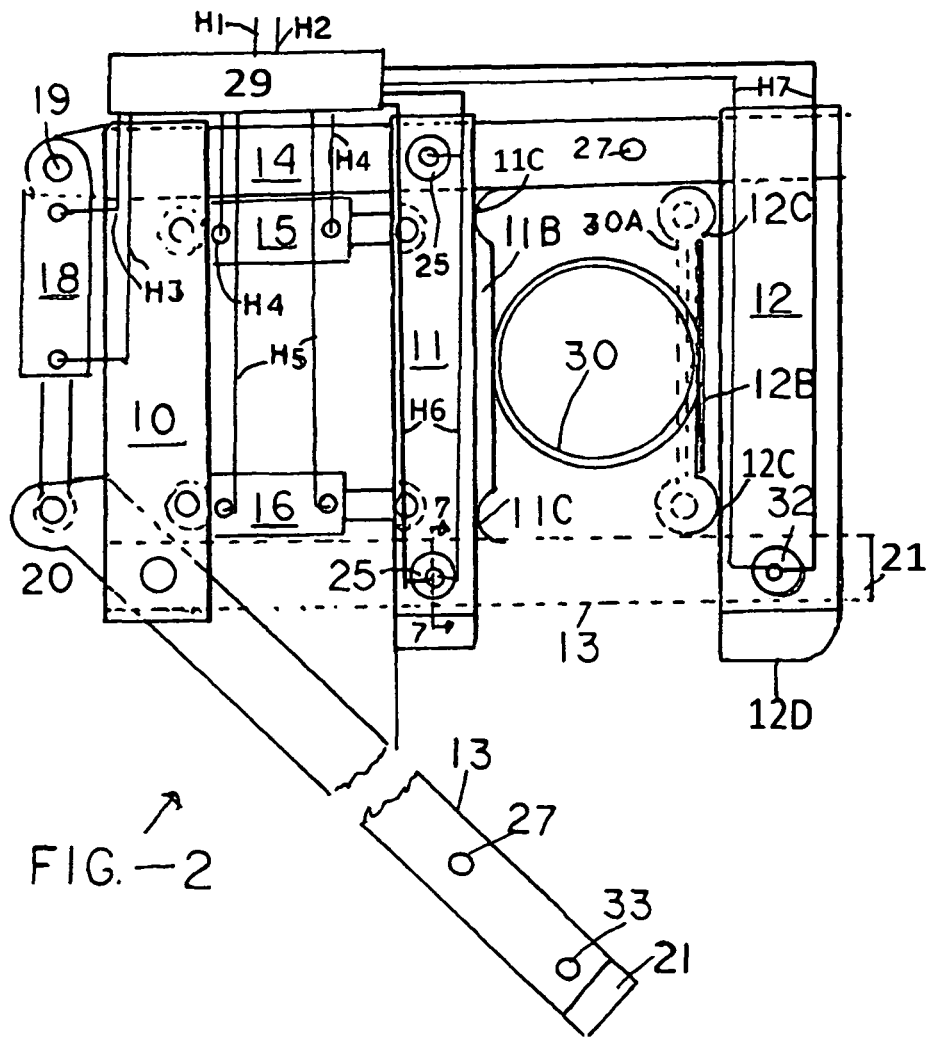
Figure 8:
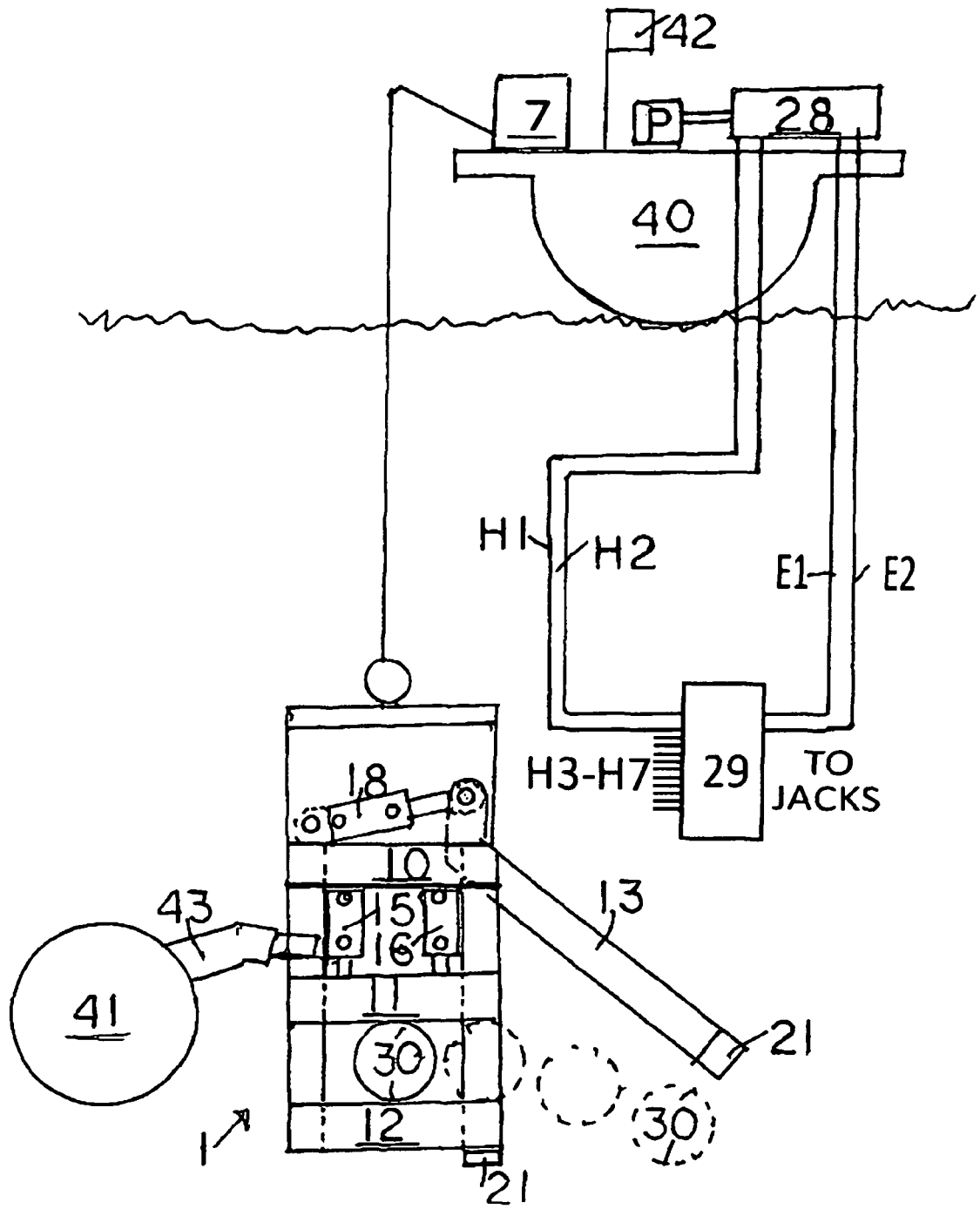

FIG. 1 shows a side view of the invention
FIG. 2 shows a side view with an arm gate in the open position
FIG. 3 is taken from line 3-3 of FIG. 1
FIG. 4 is taken from line 4 of FIG. 1
FIG. 5 is taken from line 5-5 of FIG. 1
FIG. 6 is taken from line 6-6 of FIG. 1
FIG. 7 is taken from line 7-7 of FIG. 2
FIG. 8 shows a plain view of the invention

DETAILED DESCRIPTIONS OF THE INVENTION WHEN STUDIED IN CONJUNCTION WITH THE DRAWINGS AND WRITING DESCRIPTIONS

The invention comprises a pipe pincher head 10 having an arm 14 welded, a fixed linkage 8, to head 10. The invention comprises a foot segment 12 also welded, a fixed linkage 9, to arm 14. The foot segment 12 comprises a fixed die head 12B having a radius I2C at each side of 12B. An arm gate 13 is hinged to pipe pincher head 10 by way of hinge pin linkage 22. A hydraulic actuation jack 18 is anchored to gate arm 13 by way of hinge pin linkage 20 and is anchored to arm 14 by way of hinge pin linkage 19. The invention comprises a sliding die housing 11 between arm 14 and arm gate 13. Said sliding die housing comprises a die head 11B welded to housing 11. The die head 11B also has a radius 11C formed at each of its 2 sides, as illustrated in FIG. 2. Hydraulic actuation jacks 15 and 16 are anchored to pipe pincher head 10 by way of hinge pin linkages 23 with a hydraulic ram anchored to sliding die housing 11 by way of hinge pin[s] linkages 24. The jack 18 can open gate arm 13 as shown in FIG. 2, to where the foot segment 12 with fixed die head and the sliding die housing segment can be positioned around pipe 30 as shown by FIG. 2. A support stop 21 is welded to arm gate 13 that will support the pressure from die 11B and 12B as the sliding housing 11 is moved against the foot segment 12 or moves against pipe 30 as shown by FIG. 2. Die housings 11 shows the die 11B welded to die housing 11. Likewise, the foot segment 12 has the die 12B welded to foot segment 12. The dies 11B and 12B are positioned between arm gate 14 and arm gate 13. The foot segment 12 extends past gate arm 13 to form a gate arm guide 12D that acts to guide the gate arm 13 in place as the gate arm 13 is closed.

Hydraulic jacks 25 are positioned to sliding die housing 11 to activate locking pins 26 as shown by FIG. 7. Holes 27 are drilled through sliding die housing 11 die 11B, arm 14 and arm gate 13. When the pipe 30 is pinched, as shown by FIG. 2 as 30A, the pins 26 would be activated to lock the sliding die housing 11 against pipe 30 so that pressure from the hydraulic lines can be removed from the lines H1 and H2 and the pins 26 will hold the pipe 30 in the pinched position 30A.

A hydraulic jack 32 identical to jack 25 as shown by FIG. 2 is located [to] on foot segment 12 to lock arm gate 13 in the closed position. Holes 33 would be drilled in foot segment 12 and arm gate 13 to align them together for receiving a pin which is identical to pin assembly 26, as shown in FIG. 7, except it is located on foot segment 12. A hydraulic control valve 29 represents five hydraulic control valves. H1 and H2 are supply lines from a pump P located on a control station 42 on boat 40 at the water surface.

H3 is connected to gate jack 18. H4 and H5 are connected to jacks 15 and 16 and H6 is connected to jack 25 with H7 connected to jack 32 Likewise, electric lines Eland E2 are passed from control station 42 on boat 40 to each of said valves 28 and valves 29. Where valves 29 are located to the pipe pincher 1, only the pressure line HI and return line H2 is needed from boat 40 to the pipe pincher 1. Where the valves 28 is located on boat 40, two lines would be needed for each of the five four way control valves or ten hydraulic lines, or two for each of the jacks 15 and 16, 18 and jack 25 and 32. At least two electric lines E would be needed from the boat 30 to the pipe pincher I for each control valve 28 solenoid.

It is noted that alternative to welding the dies to sliding die housing 11 and foot segment 12, the dies could be bolted to sliding die housing 11 and foot segment 12. Where a drill pipe is housed inside a pipe 30, a special set of dies would be required (not shown). The die 11B would be set against pipe 30 at an angle where pipe 30 would be pinched to force the drill pipe to one side of the pipe, then by use of the special dies pinch both the pipe and the drill pipe together. Actuation jacks 15 and 16 would be painted a different color to identify each during operation. Jacks 15 and 16 can be operated independent of each other.

In operation, a control boat station would be positioned on the surface of the water and a crane 7 would lower the deep water oil pipe pincher 1 to the location of the pipe 30. A submarine 41 having a manipulator arm 43 would position the pipe pincher 1. The gate 13 would be closed then the jacks 15 and 16 would force the die head 11 to pinch the pipe together as shown by FIG. 2.

To make the invention, the parts would be fabricated based on these drawings and writing descriptions. The hydraulics and electric components would then be connected and the pipe pincher would be ready for use.

It should be noted that many modes of the invention is possible without departing from the true spirit of the invention.

The invention claimed is:

1. A deep water remotely controlled pipe pincher designed to pinch a pipe closed laterally to stop the flow of oil comprising in combination: a head segment (10); a foot segment (12); a first fixed die (12b) housed by said foot segment and said first fixed die and further wherein said first fixed die has a radius at each end to prevent splitting of pipe being pinched; said first fixed die being welded to said foot segment; a first locking pin in said foot segment; an arm segment (14); a first fixed linkage (9) fixed to said arm segment and foot segment; a second fixed linkage (8) fixed to said head segment and said arm segment by welding; a third fixed linkage, a first hydraulic jack (18), and a first pin (19) wherein said third fixed linkage is fixed to said arm segment and said first hydraulic jack by said first pin; an arm gate (13), a second pin (20) and a first hinge pin linkage (22), wherein said arm gate and said head segment are linked by said first hinge pin linkage by way of said second pin; a sliding die housing (11), a bottom face of said sliding die housing, a second and a third locking pin (26) wherein said second and third locking pins are contained by said sliding die housing; a second and a third hydraulic jack (25), wherein one of each said second and third locking pins is actuated by one of each said second and third hydraulic jacks; a second fixed die (11b), a radius wherein said radius is at each end of said second fixed die and wherein said second fixed die is welded on said bottom face of said sliding die housing and further wherein said radius at each end is to prevent splitting of a pinched pipe; a first sliding linkage wherein said first sliding linkage is between said sliding die housing and said arm segment; a second sliding linkage wherein said second sliding die linkage between said sliding die housing and said arm gate; a fourth hydraulic jack (15) and a fifth hydraulic jack (16), a second hinge pin linkage (23) and a third hinge pin linkage (24) wherein said second and third hinge pin linkages further comprising bolts or other mechanical devices, wherein said fourth and fifth hydraulic jacks are linked to said head segment by said second hinge pin linkage and linked to said sliding die housing by said third hinge pin linkage in order to supply a needed force to move said sliding die housing; a control station (42), a hydraulic pump (p), a first hydraulic valve means (28), a second hydraulic valve means (29), a sixth hydraulic jack (32), seven hydraulic lines (H1-H7), and two electric lines (E1-E2), wherein said hydraulic pump supplies hydraulic pressure to said six hydraulic jacks by way of said first hydraulic valve means and second hydraulic valve means being in communication with one another by two of said seven hydraulic lines and said two electric lines, and wherein second hydraulic valve means allows for hydraulic pressure to be provided to all of said hydraulic jacks by way the remaining five hydraulic lines being connected to said second valve means and said six hydraulic jacks; and with a force exerted on a pipe (30) by said sliding die housing with said second fixed die and said foot segment with said first fixed die said pipe will be pinched together to stop the flow of oil.

2. A deep water remotely controlled pipe pincher according to claim 1, wherein said second and third locking pins actuated by said second and third hydraulic jacks and contained in said sliding die housing are to lock said sliding die housing after said pipe is pinched closed.

3. A deep water remotely controlled pipe pincher according to claim 1, wherein said first hydraulic jack with said third fixed linkage with said arm segment and said first hinge pin linkage with said arm gate is to open and close said arm gate and wherein said first locking pin in said foot segment is actuated by said sixth hydraulic jack to lock said arm gate in a closed position.

4. A deep water remotely controlled pipe pincher according to claim 1, wherein said foot segment further includes an arm gate guide (12D) at an end of said foot segment.

5. A deep water remotely controlled pipe pincher according to claim 1, wherein said arm gate is to include a support stop (21), wherein said support stop is welded to an end of said arm gate.

6. A deep water remotely controlled pipe pincher according to claim 1, wherein said fourth and fifth hydraulic jacks are painted different colors for identification purposes and not for aesthetic purposes.

7. A deep water remotely controlled pipe pincher comprising: a head segment (10), a first hydraulic jack (15), a second hydraulic jack (16), and a third hydraulic jack (18), wherein said head segment is connected to said first, second, and third hydraulic jacks; an arm segment (14) wherein said arm segment is welded to said head segment; a sliding die housing segment (11), a fixed die (11B) wherein said fixed die is welded to said sliding die housing segment; a sliding die housing linkage which is linked with said arm segment; said first hydraulic jack and said second hydraulic jack linked with said sliding die housing segment; a fourth hydraulic jack (25) a fifth hydraulic jack (25), and a first (26) and a second locking pin (26) wherein said first and second locking pins are housed to said sliding die housing and actuated by said fourth and fifth hydraulic jacks to lock said sliding die housing segment in place once a pipe is pinched; an arm gate (13) and a first hinge pin linkage wherein said first hinge pin linkage is between said arm gate and said head segment; said third hydraulic jack is linked with said arm gate to open and close said arm gate; said sliding die housing linkage is between said arm gate and said sliding die housing segment; a foot segment wherein said foot segment is welded to said arm segment; an arm gate guide (12D) wherein said arm gate guide is fixed to said foot segment; a sixth hydraulic jack (32) and an arm gate pin wherein said arm gate pin is actuated by said sixth hydraulic jack and further wherein said arm gate pin links said foot segment and said arm gate in order to lock said arm gate in a closed position; an arm gate support stop (21) wherein said arm gate support is welded to said arm gate; a first (28) and a second hydraulic valve (29), a plurality of hydraulic lines wherein all but two of said plurality hydraulic lines connect said second hydraulic valve to said six hydraulic jacks; a hydraulic pump (p), wherein said remaining two of said plurality of hydraulic lines connect said second hydraulic valve to said first hydraulic valve and further wherein said hydraulic pump is connected to said first hydraulic valve; an electric line means (E1-E2), a control station (42) wherein said electric line means and control station are housed at a water surface and wherein said electric line means is linked between said control station and first and second hydraulic valves; all of said control station, electric line means, hydraulic pump, hydraulic lines, hydraulic valves, enable the movable parts of the apparatus to move.

* * * * *